TODO …

United States Patent Office 3,409,582
Patented Nov. 5, 1968

3,409,582
ALKALINE REFRACTORY MIXTURES CONTAINING FORMALDEHYDE-FURYLETHYLENEALDEHYDE RESINS AND GUNNING THEREWITH
Lloyd H. Bown, Crystal Lake, Earl K. Stigger, Arlington Heights, and David D. Watson, Barrington, Ill., assignors to The Quaker Oats Company, Chicago, Ill., a corporation of New Jersey
No Drawing. Filed Apr. 22, 1964, Ser. No. 361,902
3 Claims. (Cl. 260—37)

This invention relates to the fabrication of refractory structures and to a novel refractory mix used in such fabrication.

An almost infinite variety of compositions of inorganic refractory materials are used and formulated in order to obtain the proper balance of properties and behavior of the refractory structure with the specific destructive conditions to be encountered. Hence, in the manufacture of steel, for example, different destructive conditions are met, and different refractory property and behavior are required in acid electric arc, acid open hearth, basic electric arc, basic open hearth, basic oxygen, crucible, heat treating, indirect arc electric, malleable iron, open flame and other special furnaces; in cupolas, ladles, runners, etc.

A combination of inorganic refractory ingredients which is ideal for one use with a specific set of operating variables may be entirely unsuitable for another use, or for a similar use with a different set of operating conditions.

The selection of the inorganic ingredients which go into particular refractory structures is and has been the subject of much study and experimentation and is within the purview of one skilled in refractory or ceramic art. The "Refractories Manual," published by The American Foundryman's Society in 1963, is one of many sources of information pertaining to the proper selection of inorganic refractory ingredients.

A property which is desirable in most raw refractories, i.e. comparative chemical inertness, leads to a very common problem during the fabrication, application, installation or use of a particular refractory mixture. That problem is structural instability at low and/or intermediate temperatures. For example, some patches made at low to intermediate temperature may disintegrate or lift out upon heating. Pitch-bonded basic bricks may slump during heating. Many currently available gunning mixes must be carefully dried after application to prevent rupture of the monolithic structure upon heating. Oftentimes bricks and related shapes are carefully pre-fired in order to develop ceramic bonds and resulting strength prior to their installation in order to provide good low and intermediate temperature strength.

Another problem common to many uses of refractories is that of obtaining good adhesion of the mix to structural material such as an old layer or a sublayer, as for example in application of gunning and ramming mixes and the like over safety linings.

Another problem involved in the use of these refractory mixes is that while many acid-catalyzed resins are used with materials which provide an acidic or substantially neutral pH, as for example certain sands, these acid-catalyzed binders are often completely unfit for use with many common alkaline refractories such as magnesite, dolomite and the like. It is well known that an alkaline pH is usually obtained when either an "acidic" or "basic" refractory is admixed with water.

Hence, a good general-purpose refractory binder must be capable of hardening or setting in either acid or alkaline pH conditions. It must provide structural stability at low and intermediate temperatures. Moreover, such a binder must not interfere with formation of high-temperature or ceramic bonds when the shape is heated to high operating temperatures.

Hence it is an object of this invention to provide a novel refractory mix which provides a high degree of strength and structural stability at low and intermediate temperatures.

It is a further object to provide a refractory mix which is readily adaptable to the many inorganic refractory materials, and to the myriad methods of fabricating, applying, or installing these many refractory materials.

It is a still further object of this invention to provide a refractory mix which effects adhesion to a wide variety of structural materials commonly encountered in refractory applications.

A specific object of this invention is to provide a method, utilizing the special mix of this invention, of fabricating monolithic refractory linings by use of gunning techniques.

Another specific object of this invention is to provide a method utilizing the mix of this invention to produce pitch-bonded basic refractory bricks which are not subject to appreciable slumping at intermediate temperatures.

A further specific object of this invention is to provide a method of patching ladle, furnace and other linings whereby a high degree of adhesion and rapid low-temperature and intermediate-temperature strength formation are accomplished.

These and other objects which will be apparent are accomplished by the special mix of this invention, namely a mix comprising a major portion of a refractory material and a minor portion of a binder comprising a resin produced by the acidic resinification of a composition comprising A moles of formaldehyde and B moles of furylethylene aldehyde of the general Formula I,

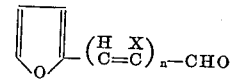

Formula I wherein X is a member of the class consisting of hydrogen and monovalent hydrocarbon radical, particularly a radical containing from 1 to 10 carbon atoms, inclusive, and $n$ is a number including one and numbers greater than one, said A and B being numbers such that the ratio $A/B$ is in the range 0 to 1.5, inclusive.

The particular inorganic refractory materials selected for use in the mix of this invention will depend on the requirements of the use intended, and this selection is within the purview of one skilled in the refractory or ceramic art. The particular inorganic refractory materials used in this invention may be either "acidic" or "basic" in the refractory sense, and may be either acidic or alkaline in the aqueous pH sense. It is not essential that a catalyst be present in the mix of this invention. However, if a catalyst is used, it is preferred that alkaline catalysts (such as sodium hydroxide, ammonium hydroxide, organic bases such as those sometimes found in pitch, etc.) be used in those embodiments employing alkaline refractory materials. It is also preferred (if a catalyst is used) that the catalyst be acidic (such as sulfuric acid, phosphoric acid, etc.) if the refractory has an acidic pH. If a catalyst is used, either acidic or alkaline catalysts may be used with refractory mixes utilizing refractories having an essentially neutral pH.

Binders of this invention which utilize formaldehyde can be prepared in accordance with the teachings of U.S. Patent No. 2,527,714 issued to Andrew P. Dunlop and E. L. Washburn and assigned to The Quaker Oats Company. Binders of this invention which do not utilize formaldehyde are also made in like manner, except that the formaldehyde ingredient is not present during the acidic resinification step. It is clear that in these embodiments A, and the ratio $A/B$, above, are zero.

Acidic resinification of the compound of Formula I with formaldehyde is preferred, however, because this produces binders which achieve greater strengths in shorter times. The increase in strength is not proportional to the amount of formaldehyde, however; in fact the strength does not increase appreciably as the molar ratio increases beyond 0.2. The most preferred molar ratio of formaldehyde to the compound having Formula I is between 0.2 and 0.5, inclusive. In operations in which odor would be a problem, formaldehyde preferably should not exceed 0.7 mole per mole of the compound of Formula I. As the ratio increases to about 1.1 or higher, the odor becomes severe. Odor problems can be eliminated, or alleviated, by the use of reaction modifiers such as those illustrated in Example 1, below. In many uses, however, odor may be of no concern. In no event, however, should the molar ratio of formaldehyde to compound of Formula I exceed 1.5.

When the molar ratio of formaldehyde to compounds of Formula I exceeds 0.5, and the acidic resinification is continued long enough to prevent subsequent crystal formation, the resulting resins will be quite viscous. Such resins are too viscous for applications wherein the binder is sprayed, such as in gunning procedures. Hence, gunning procedures require binder resins in which the ratio $A/B$ is between 0 and 0.5, inclusive, the ratios 0.2 to 0.5 being preferred. However, more viscous resins may be used in accord with this invention in any application wherein viscosity is not critical, such as, for example, in manufacture of brick, as in Example 6, below.

In the manufacture of the resin of this invention, the compound of Formula I need not be a pure compound, nor would a pure compound be particularly desirable. Mixtures of compounds of Formula I can be made in accord with the teachings of the Dunlop and Washburn U.S. Patent No. 2,527,714, or, as illustrated hereinafter, by any other equivalent means. Compounds of Formula I in which X is a monovalent hydrocarbon radical are formed by the reaction of furfural and aldehydes containing 3 to 12 carbons in the presence of an alkaline catalyst. Compounds of Formula I in which X is hydrogen are formed by the reaction of furfural and acetaldehyde in the presence of an alkaline catalyst. The crude reaction mixture will generally be a mixture of compounds so that $n$ of Formula I represents a number average value, and includes 1 and any number, and fractional number, greater than 1, preferably a number from 1 to 4, inclusive. Mixtures of compounds of Formula I more preferred for use in this invention are those mixtures produced by alkaline coupling of acetaldehyde and furfural in a molar ratio between about 1.7 and about 2.2. In binders prepared from mixtures of compounds of Formula I prepared by alkaline coupling of acetaldehyde and furfural in a molar ratio below about 1.7, crystalline materials tend to form in the final resin upon standing. While crystal formation in the binder can be alleviated by extending the time of the acidic resinification reaction, the use of this alternative will not be desirable in all cases since the viscosity development is also somewhat proportional to time of the acidic resinification reaction. Hence in embodiments of this invention in which the resin is to be sprayed or discharged into a high-velocity airstream, e.g. in gunning operations, a resin having high viscosity is undesirable. In fact, it is essential that the binder used in gunning operations have a viscosity below 200 cps. at 150° C. A preferred method for lowering the viscosity of a resin binder of this invention is mixing the resin with a compound of Formula I, in which $n$ is 1, and X is lower monovalent hydrocarbon radical, e.g. a radical containing 6 or less carbons. On the other hand, higher viscosities or crystal formation are of relatively little consequence in those embodiments of this invention involving the manufacture of bricks and refractory shapes, as for example pitch-containing magnesite brick.

Mixes of this invention intended for use in fabrication of monolithic linings or patches are preferably made in situ, as is illustrated in Example 4 below. In preferred embodiments the reaction modifiers (if any) are premixed with the inorganic refractory aggregate.

Preferred reaction modifiers include 50% aqueous urea solution (up to about 1.2% by weight, based on the aggregate), 50% caustic solution (up to about 1% by weight, based on the aggregate), ammonia (up to about 0.05% by weight based on the refractory), and triethylenetetramine (up to about 0.33% based on the aggregate).

The inorganic refractory aggregate is conveyed to a point of application in a high-velocity airstream, and the special liquid binder is discharged (e.g. sprayed) into the airstream near the discharge of the air-refractory mixture. The special binders used for these embodiments are any of the resin binders of this invention in which the ratio $A/B$, above, is 0 to 0.5, inclusive, and which have a viscosity less than about 200 cps. at 150° C. The preferred binders are those prepared from a furylethylene aldehyde composition which is a mixture formed by the alkaline coupling of furfural and acetaldehyde having a molar ratio between 1.7 and 2.2. The preferred ratio of formaldehyde to furylethylene aldehyde composition is 0.2 to 0.5 at the beginning of the acidic resinification. The resin may be heated to facilitate mixing or spraying. A temperature which provides a viscosity of about 200 cps. or less is the preferred temperature of the resin in gunning operations by which monolithic linings are prepared.

A preferred method for preparing the resin binder of this invention is described below in Example 1. In this example and in all examples herein, parts are in parts by weight and percent is in percent by weight. In any reference to resin pH herein, pH is measured on a pH meter using glass-calomel electrodes immersed in the stirred water-containing resin sample. Any reference to acidic or alkaline or neutral pH refractories herein is based on the pH of the water (100 parts) admixed with the refractory (50 parts) as measured by a glass-calomel electrode system with a pH meter at room temperature.

Example 1

Furfural (144 parts) and acetaldehyde (145.2 parts) were premixed under a nitrogen gas blanket. In a different reactor fitted with addition means, means for heating, and means for refluxing and distilling, water (42 parts) and 25% aqueous sodium hydroxide solution (2.1 parts) were admixed and heated to about 100° C. After nitrogen blanket was established over the solution, the furfuryl-acetaldehyde mixture was added slowly to the hot alkaline solution over a period of about 4½ hours at a rate which kept the solution refluxing at slightly below 100° C. without external heat. Two hours after the beginning of the addition, an additional two parts of the 25% caustic solution was added, and at 3½ hours from the beginning of the addition an additional 1.6 parts of caustic solution was added. After the furfural-acetaldehyde solution addition was complete, the system was maintained at reflux for about thirty minutes, during which time the pot temperature rose from about 94° to about 101° C. The batch was then cooled to about 70° C. and acidified to a pH of 4.6 by the addition of 11.3 parts of 18.5% aqueous hydrochloric acid. Then 60.8 parts of 37% formalin were added, and the pH was adjusted to 1.3 by the addition of 4.8 parts of 18.5% hydrochloric acid. The batch was then heated to 100° C. and maintained at reflux by use of external heat for a period of two hours. During this period the hot viscosity as measured by a 108-ml.-consistency cup with a ³⁄₃₂" aperture increased from 40.2 seconds to 45.8 seconds. The pH of the batch was then adjusted to 4.7 by means of 3.4 parts of 25% sodium hydroxide solution. The entire batch was vacuum distilled for four hours at temperatures from about 84° C. to about 94° C. at pressures down to 71 mm. of mercury.

The procedure of Example 1 gave 235 parts of resin and about 150 parts of distillate. Other bases can be used as catalyst in the initial polymerization of furfural and acetaldehyde. If lime is used there is no need for the incremental addition of the base. For example, 2.25 parts of hydrated lime added to the initial 42 parts of water in a procedure similar to Example 1, except that no caustic is used, eliminates the need for additional base catalyst and performs satisfactorily during the entire reaction. Generally after the initial polymerization of furfural and acetaldehyde is completed the pH of the system can be adjusted to between about 3 and about 7 and can be left with no detrimental effect at this pH for long periods of time. The pH of the system during the acidic resinification or the condensation with formaldehyde is preferably below about 1.4. However, the reaction becomes difficult to control at pH's appreciably below about 1.0.

Before the final distillation of the crude resin mixture the pH should be adjusted to between about 4.5 and 6.5. Though some water may be present in the bound refractory mix, it is preferable that all water be distilled from the crude resin. Only after the distillation of water is complete can highly odorous material be readily removed. The product of a procedure such as Example 1 is fairly "odor free." Alternatively, the resin of this invention can be produced by any similar process. The use of the refractory mix of this invention to produce pitch-containing magnesite bricks is illustrated in Example 2.

Example 2

One batch of pitch-containing magnesite bricks was produced in accord with a prior art method and is referred to below as the control batch. A second batch of pitch-containing magnesite bricks was produced in accordance with this invention. In both batches periclase was used. Both batches utilized coal-tar pitch with ball-and-ring softening point 96° C., containing 36% benzene insolubles, 17.1% quinoline insolubles, having a density of 1.31 grams per cc., a coke value of 51.2%, and distillable at 360° value of 3.4%.

The resin utilized in the second batch was prepared in accordance with Example 1. However, ten parts of furfural were added per 100 parts of resin in order to decrease its activity and to extend the bench life of the aggregate pitch-resin mix.

In the control batch, the magnesite was mixed with 10% by weight based on the weight of the magnesite of the above coal-tar pitch at 145° C. This mix showed good flow at molding pressures of 700 p.s.i.

In the second batch, the magnesite was mixed with 8% pitch and 2% of the furfural-modified resin at 95–100° C. The lower mixing temperature permissible here resulted from the reduced viscosity of the pitch-resin blend, compared to pitch alone. Immediately after preparation this mixture exhibited a flow at 700 p.s.i. equivalent to the control mix. Although flow was reduced somewhat after storage for 30 minutes at 170° C., the flow is still satisfactory for molding at pressures of 700 p.s.i.

Test specimens of both of the above mixes were prepared. These specimens were two inches in diameter by approximately one inch thick an were molded for three minutes at 120° C. at 700 p.s.i. pressure. The aggregate-containing pitch only was preheated prior to molding; the aggregate-containing pitch-resin mix was held at 170° C. for thirty minutes prior to molding. The control specimen was difficult to remove from the mold and was quite soft and easily deformed. The second batch specimen containing the resin was subject to plastic deformation but to a much lesser degree than the control. The removal of second-batch specimens from the mold was much easier. On cooling, the control specimen had a Shore D hardness of 80 to 85 when cold, whereas the resin mix specimen exhibited a Shore D hardness of 85 to 90. Both sets of specimens were subjected to "hot aging" by the following procedure: Placed discs on a metal plate and put them into a forced-air oven that was previously heated to 170° C. The discs were allowed to heat for 30 minutes before the initial or zero hour reading was taken. The rest of the hot aged specimens were maintained in the oven at 170°, and hot Shore D hardness was determined after 4, 8 and 12 hours. The data obtained is summarized in Table I.

TABLE I

| Hours at 170° C. | Hot (170°) Shore D Hardness | |
|---|---|---|
| | Resin Mix | Control |
| 0 | 0–2 | 0–2 |
| 4 | 20 | 0–2 |
| 8 | 35 | 0–2 |
| 12 | 45–50 | 0–2 |

The resin-containing specimen was quite rigid while hot. This specimen suffered virtually no deformation from the full pressure of the heel of the hand on the rim. The control after 12 hours could be easily deformed by minor pressures around the rim. After cooling, both sets of specimens then indicated cold Shore D hardness of 85 to 90, and both were rigid.

Example 3

Two sets of test specimens were prepared as in Example 2. Immediately after molding, both sets of specimens were treated for five hours at 170° C. At this time the hot Shore D hardness at 170° C. was 0 to 2 for the control and 20 to 25 for the resin-containing specimens produced in accord with this invention. The specimens were cooled overnight and then placed on edge in a muffle furnace. The temperature of the furnace was raised to 600° C. in 1½ hours. The control specimen had slumped into the shape of an egg, whereas the resin specimen produced in accord with this invention exhibited no flattening of the circle and only minor bowing.

Example 4

This example illustrates the use of the mix of this invention in a gunning system to fabricate an in-place patch in a large steel ladle. In this embodiment catalysts and resin modifiers were added to the muller in which the inorganic refractory aggregate was blended. The approximate composition of the mulled refractory aggregate mixture is illustrated in Table II, in which TETA refers to triethylenetetramine, and basic aggregate refers to a magnesite, dead-burned dolomite refractory mixture.

TABLE II

| | |
|---|---|
| Basic aggregate | 2000 |
| Urea[1] | 12 |
| $H_2O$[1] | 12 |
| NaOH[1] | 10 |
| $H_2O$[1] | 10 |
| TETA | 6.5 |
| $NH_4OH$ (28% $NH_3$) | 1.0 |

[1] Premixed.

While the resulting refractory mix appeared slightly damp, it was comparatively free flowing and was readily handled in the Jetliner gun, model No. 240S. In this type of gun, which is readily available in commercial practice, the refractory mix is conveyed to the point of application in a high-velocity airstream by means of suitable hoses. Near the point of discharge from the refractory-conveying hose a binder can be injected or discharged into the refractory-containing airstream by means of orifices or nozzles disposed in or around the refractory-conveying nozzle. In the procedure of this example the above Jetliner gun was employed to discharge the above mulled refractory at the rate of about five tons per hour. Resin produced by a method similar to that of Example 1 was heated to about 120° to 150° F. and was discharged at the nozzle into the high-velocity airstream containing the above refractory mix at such a rate that the resulting patch contained between about 3.8% and about 5% resin by weight based on the weight of the applied refractory. In this test approximately 5,000 pounds of aggregate was required to fabricate the patch on the ladle wall. Three hours after the gunning was completed, about 250 tons of molten steel was poured into the ladle. Some gassing was observed in that flames were observed at the weep holes. After the ladle was emptied it was observed that slag had removed more completely from the patched area than from the surrounding areas and that even the loose rebound refractory had adhered to the bottom of the ladle and was an intact monolithic layer after the pouring. This ladle continued in service and the patched area was still in serviceable condition when the ladle was taken out of service because of excessive wear in other portions of the ladle.

Example 5

This example further illustrates the use of the refractory mix of this invention in gunning operations. The catalyzed refractory aggregate was prepared as in Example 4 and stored in paper bags for a period of approximately one month. A resin prepared by a procedure similar to that of Example 1 was admixed with furfuryl alcohol in such an amount to provide a furfuryl alcohol content of about 12% by weight based on the weight of the resin. A large ladle having thirteen heats was laid on its side and cooled sufficiently for a man to walk into it. The stored aggregate was charged to the gunning equipment and conveyed to the nozzle at the rate of about five tons per hour in a high-velocity airstream. Resin was discharged at about 150° F. into this airstream at the nozzle. The resin was applied at the rate of 4.5 to 5.5% by weight based on the weight of the aggregate. A patch around the entire circumference of the bottom wall of the ladle was installed in this demonstration. Since the ladle was lying on its side, a portion of this patch was applied by directing the high-velocity refractory mix in an upward direction. While some rebound was encountered, the entire circle was readily patched and the mix exhibited a remarkable degree of adhesion to even the overhead portion of the ladle wall. It is noted that this ladle was lined with an acidic type refractory brick, and the surface to which the patch was applied was covered by a slaglike glaze of unknown composition. In the course of the usual subsequent steel mill operations, this ladle was warmed prior to the pouring of the heat. Again considerable gassing was observed when steel was poured into the ladle, as evidenced by flames at the weep holes, but after the ladle was emptied it was again found that the entire patch was in excellent condition and that surprisingly little slag had adhered to the patched area as compared to the rest of the ladle lining. The patched ladle continued in service and the patch was still in serviceable condition when the ladle was taken out of service because of wear in other areas of the ladle lining.

Example 6

This example illustrates the use of the refractory mix of this invention in the fabrication of bricks.

Periclase (1600 parts) was mulled with 20 parts of 50% by weight aqueous sodium hydroxide solution, 24 parts of 50% by weight aqueous urea solution, 6.6 parts of triethylenetetramine, 1 part of ammonium hydroxide aqueous solution (29% NH₃), and finally with 100 parts of binder resin prepared by a method similar to that of Example 1. Compressive strength test cylinders (2″ x 2″) were formed by ramming this mulled refractory mix into suitable molds. Cylinders which were allowed to stand at room temperature were tested for compressive strength afetr several time intervals. The results are summarized in Table III.

TABLE III

| Time, hrs.: | Compressive strength, p.s.i. |
|---|---|
| 1½ | 50 |
| 18 | 326 |
| 36 | 726 |

The other cylinders were placed in a room-temperature muffle furnace immediately after they were made. The furnace was turned on, and specimens were removed at various intervals while the furnace was heating up. The specimens were tested for compressive strength upon cooling to room temperature. The results are summarized in Table IV.

TABLE IV

| Conditions | | P.s.i., Compressive Strength |
|---|---|---|
| Removal Time | Removal Temp., °F. | |
| 22 minutes | 600 | 1,500 |
| 34 minutes | 900 | 1,080 |
| 48 minutes | 1,200 | 407 |
| 90 minutes | 1,800 | 169 |

The heated specimens "burned" with substantially no odor or visible fumes. The cylinders did not sag, crack, or distort during heating.

In the test procedures of Example 6, the test cylinders were made individually after the refractory mix was made up. Times referred to in the tables refer to lapsed time starting with the fabrication of the test cylinders.

The mix produced according to the procedure of Example 6 is shaped into bricks and other refractory shapes by ramming into suitable enclosures.

While we do not want to be bound by any theories, we believe that, based on observations made during tests similar to Example 6 and during actual steel mill operations, upon thermal destruction of the binder resin of this invention a carbon deposit forms, and this contributes to the bonding of the aggregate particles and to the high strengths. Upon exposure to prolonged high-temperature conditions, however, we have observed the formation of distinct layer-like zones within the refractory bound in accord with this invention. A removed section of gunned basic refractory patch taken from a ladle which had been used to contain several heats of steel was observed to have a very light, uncontinuous layer of slag at the steel-contacting surface. Below this was a thin zone of clean refractory which appeared to contain no carbon or binder, and then a zone apparently containing little resin but containing carbon. Each zone was about ⅛″ thick. Under these layer-like zones the rest of the lining appeared to contain carbon and resin. The refractory appeared to be bonded also by a refractory or ceramic type bonding. The removed section was extremely hard and strong. It is emphasized that the refractory mass appeared to be continuous through its depth, and that the zones referred to above were based on appearance rather than on the existence of actual layers.

In addition to the specific uses illustrated above, the mix of this invention has many other uses obvious to those skilled in the art. One example is the use of the mix of this invention, formed in place, in the fabrication of basic oxygen process furnace linings.

We claim:

1. In a gunning method of making a refractory structure, the improvement comprising the steps of admixing a basic catalyst and a major portion of an alkaline refractory material, conveying the resulting refractory mixture in a high velocity air stream, discharging a liquid binder into the air stream near the point of application, said liquid binder comprising a resin produced by the acidic resinification of a composition comprising A moles of formaldehyde and B moles of furylethylene aldehyde of the general formula

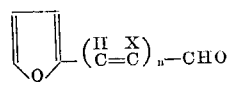

wherein X is a member of the class consisting of hydrogen and monovalent hydrocarbon radical and $n$ is a number including one and numbers greater than one, said A and B being numbers such that the ratio of $A/B$ is in the range 0.2 to 0.5, inclusive, said binder having a viscosity less than 200 cps. at 150° C.

2. A method as in claim 1 in which the basic catalyst includes an amine in an amount between 2% and 30% based on the amount of the binder discharged, in which the binder is used in an amount between 3% and 8% based on the weight of the refractory, and in which said furylethylene-aldehyde is a mixture produced by alkaline coupling of furfural and acetaldehyde in a molar ratio between about 1.7 and about 2.3.

3. A method as in claim 1, in which the basic catalyst includes up to about 0.5% by weight of caustic, up to about 0.6% by weight urea, and up to about 0.33% by weight triethylenetetramine based on the amount of refractory.

References Cited
UNITED STATES PATENTS

| | | | |
|---|---|---|---|
| 1,091,567 | 3/1914 | Eldred | 264—30 |
| 2,363,829 | 11/1944 | Caplan | 260—67 |
| 2,527,714 | 10/1960 | Dunlop et al. | 260—67 |
| 2,963,463 | 12/1960 | Harvey et al. | 260—37 |
| 3,112,208 | 11/1963 | Johnson | 106—56 |
| 3,205,191 | 9/1965 | Watson et al. | 260—37 |
| 3,216,075 | 10/1965 | Brown | 260—37 |

MORRIS LIEBMAN, *Primary Examiner.*

J. E. CALLAGHAN, *Assistant Examiner.*

UNITED STATES PATENT OFFICE
CERTIFICATE OF CORRECTION

Patent No. 3,409,582                                                    November 5, 1968

Lloyd H. Brown et al.

It is certified that error appears in the above identified patent and that said Letters Patent are hereby corrected as shown below:

In the heading to the printed specification, "Bown" should read -- Brown --.

Signed and sealed this 31st day of March 1970.

(SEAL)
Attest:

Edward M. Fletcher, Jr.                                WILLIAM E. SCHUYLER, JR.
Attesting Officer                                               Commissioner of Patents